United States Patent
Dong (10) Patent No.: US 9,705,944 B2
(45) Date of Patent: Jul. 11, 2017

(54) MULTI-TERMINAL SYNCHRONOUS PLAY CONTROL METHOD AND APPARATUS

(71) Applicant: Huawei Technologies Co., Ltd., Shenzhen, Guangdong (CN)

(72) Inventor: Yu Dong, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 745 days.

(21) Appl. No.: 14/040,190

(22) Filed: Sep. 27, 2013

(65) Prior Publication Data

US 2014/0173057 A1 Jun. 19, 2014

(30) Foreign Application Priority Data

Dec. 18, 2012 (CN) .......................... 2012 1 0552097

(51) Int. Cl.
*H04L 12/18* (2006.01)
*H04N 21/242* (2011.01)
(Continued)

(52) U.S. Cl.
CPC ...... *H04L 65/4015* (2013.01); *H04L 12/1822* (2013.01); *H04L 65/60* (2013.01);
(Continued)

(58) Field of Classification Search
CPC . H04L 65/60; H04L 65/4015; H04L 12/1282; H04N 21/242; H04N 21/25833;
(Continued)

(56) References Cited

U.S. PATENT DOCUMENTS

| 6,175,872 B1 | 1/2001 | Neumann et al. |
| 8,290,603 B1 | 10/2012 | Lambourne |

(Continued)

FOREIGN PATENT DOCUMENTS

| CN | 101132474 A | 2/2008 |
| CN | 101764994 A | 6/2010 |

(Continued)

OTHER PUBLICATIONS

"DIY for Mini GNU/Linux: Part Four, Enhanced multimedia player", May 2006, 8 pages.

*Primary Examiner* — Glenton B Burgess
*Assistant Examiner* — Brandon L Sykes (57) ABSTRACT

Embodiments of the present invention provide a multi-terminal synchronous play control method and apparatus. The method includes: receiving, by a virtual server, a play instruction issued by a user, where the play instruction is an instruction for playing a media file; and sending, by the virtual server, control information respectively to player terminals entering a virtual studio, where the control information is used to control the player terminals to play the media file synchronously on corresponding channels at corresponding play time. With the multi-terminal synchronous play control method and apparatus, multiple player terminals can play the same media file synchronously, and different player terminals can play different channels of the same media file synchronously, which achieves a good play effect and improves the play experience of the user.

19 Claims, 3 Drawing Sheets

(51) Int. Cl.
   *H04L 29/06*    (2006.01)
   *H04N 21/43*    (2011.01)
   *H04N 21/6332*  (2011.01)
   *H04N 5/765*    (2006.01)
   *H04N 21/258*   (2011.01)
   *H04N 21/432*   (2011.01)

(52) U.S. Cl.
   CPC ........... *H04N 5/765* (2013.01); *H04N 21/242* (2013.01); *H04N 21/25833* (2013.01); *H04N 21/25841* (2013.01); *H04N 21/43* (2013.01); *H04N 21/4307* (2013.01); *H04N 21/4325* (2013.01); *H04N 21/6332* (2013.01)

(58) Field of Classification Search
   CPC ............. H04N 21/25841; H04N 21/43; H04N 21/4307; H04N 21/4325; H04N 21/6332; H04N 5/765
   See application file for complete search history.

(56) References Cited

U.S. PATENT DOCUMENTS

| | | |
|---|---|---|
| 2004/0176025 A1 | 9/2004 | Holm et al. |
| 2004/0248601 A1 | 12/2004 | Chang |
| 2006/0156375 A1* | 7/2006 | Konetski .................. H04N 5/76 725/135 |
| 2006/0270395 A1 | 11/2006 | Dhawan et al. |
| 2007/0087686 A1* | 4/2007 | Holm ........................ H04S 7/30 455/3.06 |
| 2007/0214942 A1 | 9/2007 | Usa |
| 2008/0008324 A1 | 1/2008 | Sim et al. |
| 2008/0045140 A1 | 2/2008 | Korhonen |
| 2008/0053286 A1 | 3/2008 | Teicher |
| 2008/0146216 A1* | 6/2008 | Newman ............. H04L 12/2697 455/424 |
| 2008/0165631 A1 | 7/2008 | Mamane et al. |
| 2008/0216125 A1 | 9/2008 | Li et al. |
| 2009/0222520 A1 | 9/2009 | Sloo et al. |
| 2010/0151783 A1 | 6/2010 | Cohen |
| 2011/0047247 A1 | 2/2011 | Katz et al. |
| 2012/0082424 A1* | 4/2012 | Hubner ................ H04N 21/242 386/219 |

FOREIGN PATENT DOCUMENTS

| | | |
|---|---|---|
| CN | 103065658 A | 4/2013 |
| EP | 1 784 049 A1 | 5/2007 |

* cited by examiner

MULTI-TERMINAL SYNCHRONOUS PLAY CONTROL METHOD AND APPARATUS

CROSS-REFERENCE TO RELATED APPLICATIONS

This application claims priority to Chinese Patent Application No. 201210552097.8 filed on Dec. 18, 2012, which is hereby incorporated by reference in its entirety.

TECHNICAL FIELD

The present invention relates to the multimedia play field, and in particular, to a multi-terminal synchronous play control method and apparatus.

BACKGROUND

With the development of smart terminals and the Internet, user requirements on multimedia services increase. For example, when several users interested in music expect to share a piece of pleasant music at the same moment, they use player terminals such as a computer, a smart phone and an iPad to play the music simultaneously by manual operation. However, the manual operation for playing incurs a time deviation which renders the play progress of the player terminals asynchronous, thereby deteriorating the effect of synchronous sharing.

In the prior art, a sound system is designed to synchronize the play between different player terminals. The sound system includes a media center, multiple player terminals, a touchscreen controller, and so on. Each player terminal can perform radio communications with the touchscreen controller to receive control information sent by the touchscreen controller and implement synchronous play. However, in the prior art, a player terminal out of the sound system is unable to synchronize play with a player terminal in the sound system, which brings inconvenience to users.

SUMMARY

Embodiments of the present invention provide a multi-terminal synchronous play control method and apparatus, which are used to control multiple player terminals to play the same media file synchronously.

In a first aspect, an embodiment of the present invention provides a multi-terminal synchronous play control method, including:

receiving, by a virtual server, a play instruction issued by a user, where the play instruction is an instruction for playing a media file;

determining, by the virtual server, play time and play channels of at least two player terminals entering a virtual studio; and sending, by the virtual server, control information respectively to the player terminals entering the virtual studio, where the control information includes information about the play time and the play channels of the player terminals and is used to control the player terminals to play the media file synchronously on corresponding channels at corresponding play time.

With reference to the first aspect, in a first implementation, before the virtual server receives the play instruction issued by the user, the method further includes:

receiving, by the virtual server, an entering request sent by the player terminals, and adding the player terminals to the virtual studio; or searching, by the virtual server, for the player terminals according to location information of the player terminals, sending an invitation instruction to the player terminals, receiving an invitation response sent by the player terminals, and adding the player terminals to the virtual studio.

With reference to the first aspect or the first implementation of the first aspect, in a second implementation, before the virtual server determines the play channels of the at least two player terminals entering the virtual studio, the method further includes:

sending, by the virtual server, a detection instruction to the player terminals entering the virtual studio, where the detection instruction is used to instruct each of the player terminals to play a first test media file and record what another player terminal plays when the other player terminal plays the first test media file to obtain a second test media file as a record file; and receiving, by the virtual server, the record files sent by the player terminals.

With reference to the second implementation of the first aspect, in a third implementation, the determining, by the virtual server, the play channels of the at least two player terminals entering the virtual studio, includes:

analyzing, by the virtual server, play features of the player terminals according to the record files, and determining the play channels of the player terminals according to the play features.

With reference to the second or third implementation of the first aspect, in a fourth implementation, the control information further includes spatial placement information of the player terminals, and the method further includes:

determining, by the virtual server, spatial placements of the player terminals according to the play features.

With reference to the first aspect to the fourth implementation of the first aspect, in a fifth implementation, the determining, by the virtual server, the play time of the at least two player terminals entering the virtual studio, includes:

determining, by the virtual server, the play time of the player terminals according to audio adapter delay information of the player terminals and information about a deviation between system time of the player terminals and system time of the virtual server.

In a second aspect, an embodiment of the present invention provides a multi-terminal synchronous play control method, including:

receiving, by a player terminal entering a virtual studio, control information sent by a virtual server, where the control information includes information about play time and a play channel of the player terminal; and playing, by the player terminal, a media file on the corresponding channel at the corresponding play time.

With reference to the second aspect, in a first implementation, before the player terminal entering the virtual studio receives the control information sent by the virtual server, the method further includes:

searching, by the player terminal, for the virtual studio according to location information of the virtual studio, and sending an entering request to the virtual studio; or, receiving, by the player terminal, an invitation instruction sent by the virtual server, and sending an invitation response to the virtual server.

With reference to the second aspect or the first implementation of the second aspect, in a second implementation, before the player terminal entering the virtual studio receives the control information sent by the virtual server, the method further includes:

receiving, by the player terminal, a detection instruction sent by the virtual server, where the detection instruction is used to instruct each of the player terminals to play a first test media file and record what another player terminal plays when the other player terminal plays the first test media file to obtain a second test media file as a record file;

playing, by the player terminal, the first test media file, and recording the second test media file to obtain the record file; and sending, by the player terminal, the record file to the virtual server.

With reference to the second aspect or either one of the first implementation and the second implementation of the second aspect, in a third implementation, the control information further includes a spatial placement of the player terminal.

With reference to the second aspect or any one of the first implementation to the third implementation of the second aspect, in a fourth implementation, the playing, by the player terminal, a media file at the corresponding play time, includes:

determining, by the player terminal, a play progress time point $t_3$ according to $t_3 = Tn + t_2 - Ts + t_1$, where Tn is current system time of the player terminal, $t_2$ is a deviation between the system time of the player terminal and system time of the virtual server, Ts is the play time, and $t_1$ is an audio adapter delay of the player terminal.

With reference to the second aspect or any one of the first implementation to the fourth implementation of the second aspect, in a fifth implementation, the playing, by the player terminal, a media file on the corresponding channel at the corresponding play time, includes:

extracting, by the player terminal, a channel play file of the corresponding channel from the media file; and playing, by the player terminal, the channel play file on the corresponding channel at the corresponding play time.

In a third aspect, an embodiment of the present invention provides a virtual server, including:

a receiving module, configured to receive a play instruction issued by a user, where the play instruction is an instruction for playing a media file;

a determining module, configured to determine play time and play channels of at least two player terminals entering a virtual studio; and a sending module, configured to send control information respectively to the player terminals entering the virtual studio, where the control information includes information about the play time and the play channels of the player terminals and is used to control the player terminals to play the media file synchronously on corresponding channels at corresponding play time.

With reference to the third aspect, in a first implementation, the receiving module is further configured to receive an entering request sent by the player terminals, so that the virtual server adds the player terminals to the virtual studio; or the sending module is further configured to search for the player terminals according to location information of the player terminals, and send an invitation instruction to the player terminals, and therefore, the receiving module is configured to receive an invitation response sent by the player terminals, and the virtual server adds the player terminals to the virtual studio.

With reference to the third aspect or the first implementation of the third aspect, in a second implementation, the sending module is further configured to send a detection instruction to the player terminals entering the virtual studio, where the detection instruction is used to instruct each of the player terminals to play a first test media file and record what another player terminal plays when the other player terminal plays the first test media file to obtain a second test media file as a record file; and the receiving module is configured to receive the record files sent by the player terminals.

With reference to the second implementation of the third aspect, in a third implementation, the determining module is configured to analyze play features of the player terminals according to the record files, and determine the play channels of the player terminals according to the play features.

With reference to the second or third implementation of the third aspect, in a fourth implementation, the control information further includes spatial placement information of the player terminals, and therefore, the determining module is configured to determine spatial placements of the player terminals according to the play features.

With reference to the third aspect or any one of the first implementation to the fourth implementation of the third aspect, in a fifth implementation, the determining module is configured to determine the play time of the player terminals according to audio adapter delay information of the player terminals and information about a deviation between system time of the player terminals and system time of the virtual server.

With reference to the third aspect or any one of the first implementation to the fifth implementation of the third aspect, in a sixth implementation, the virtual server is arranged on a public network server or on any one of the player terminals entering the virtual studio.

In a fourth aspect, an embodiment of the present invention provides a player terminal, including:

a receiving module, configured to receive control information sent by a virtual server, where the control information includes information about play time and a play channel of the player terminal; and an executing module, configured to play a media file on the corresponding channel at the corresponding play time.

With reference to the fourth aspect, in a first implementation, the player terminal further includes a sending module, configured to search for the virtual studio according to location information of the virtual studio, and send an entering request to the virtual studio; or, the receiving module is further configured to receive an invitation instruction sent by the virtual server, so that the sending module sends an invitation response to the virtual server.

With reference to the fourth aspect or the first implementation of the fourth aspect, in a second implementation, the receiving module is configured to receive a detection instruction sent by the virtual server, where the detection instruction is used to instruct each of the player terminals to play a first test media file and record what another player terminal plays when the other player terminal plays the first test media file to obtain a second test media file as a record file; and therefore, the executing module is configured to play the first test media file and record the second test media file to obtain the record file; and the sending module is configured to send the record file to the virtual server.

With reference to the fourth aspect or either one of the first implementation and the second implementation of the fourth aspect, in a third implementation, the control information further includes a spatial placement of the player terminal.

With reference to the fourth aspect or any one of the first implementation to the third implementation of the fourth aspect, in a fourth implementation, the player terminal further includes a determining module, configured to determine a play progress time point $t_3$ according to $t_3=Tn+t_2-Ts+t_1$, where Tn is current system time of the player terminal, $t_2$ is a deviation between the system time of the player terminal and system time of the virtual server, Ts is the play time, and $t_1$ is an audio adapter delay of the player terminal.

With reference to the fourth aspect or any one of the first implementation to the fourth implementation of the fourth aspect, in a fifth implementation, the executing module is configured to extract a channel play file of the corresponding channel from the media file; and play the channel play file on the corresponding channel at the corresponding play time.

With the multi-terminal synchronous play control method and apparatus provided in the embodiments of the present invention, a virtual server that creates a virtual studio controls play time and a play channel of each player terminal by sending control information to the player terminal entering the virtual studio. In this way, terminals outside a sound system can enter the virtual studio to play a media file synchronously under control of the virtual server, which facilitates users and improves play experience of the users.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
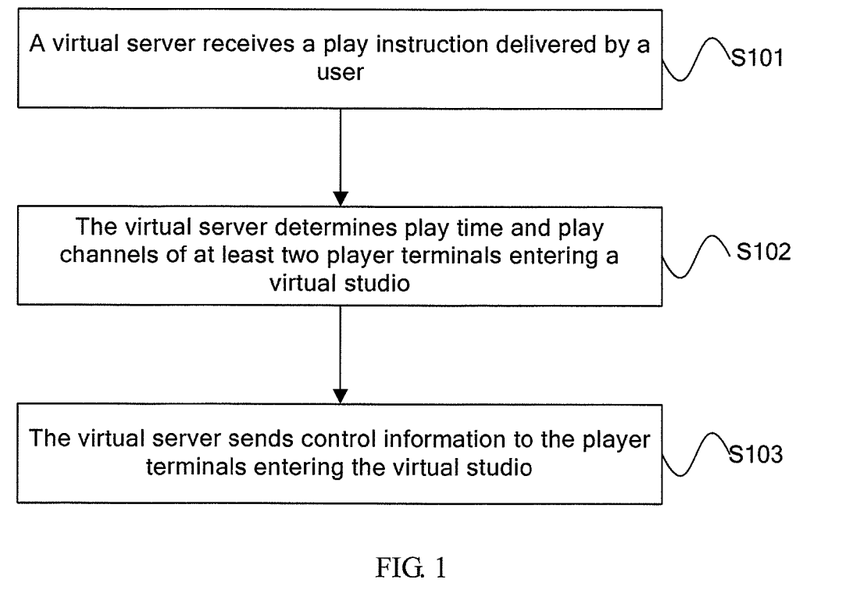
FIG. 1 is a flowchart of a multi-terminal synchronous play control method according to a first embodiment of the present invention.

FIG. 1 is a flowchart of a multi-terminal synchronous play control method according to a first embodiment of the present invention. As shown in FIG. 1, the entity for performing the following steps is a virtual server. The virtual server may be arranged on a public network server or on any one of the player terminals entering a virtual studio. A virtual studio is created on the virtual server, and various player terminals, including devices in a sound system and devices out of the sound system such as a mobile phone, a PAD, and a PC, may enter the virtual studio to play a media file synchronously. The method includes the following steps:

S101. The virtual server receives a play instruction issued by a user.

The play instruction is used as an instruction for playing the media file. Specifically, the user may install player software on the player terminal, and click the player software to trigger the play instruction to be delivered to the virtual server, where the play instruction may be used to instruct multiple player terminals in the virtual studio to play the media file synchronously.

S102. The virtual server determines play time and play channels of at least two player terminals entering the virtual studio.

The player terminal involved in the embodiment of the present invention refers to a player terminal entering the virtual studio. In a practicable implementation, on the player terminal, the user may input an identifier (ID) of the virtual studio created by the virtual server to search for the virtual studio, and the player terminal may send an entering request for entering the virtual studio to the virtual studio; upon receiving the entering request sent by the player terminal, the virtual server may add the player terminal sending the request into the virtual studio.

In another practicable implementation, the virtual server may search for the player terminal according to location information of the player terminal. Specifically, a resource file of the player software carries a pseudo identifier indicative of the player. When being installed on the player terminal, the player software reports the pseudo identifier to the virtual server. Alternatively, the user may use the player software to associate the pseudo identifier stored in the virtual server with a user name of the player terminal. When the user starts the player software or when the player software runs at the background of the player terminal, the player software invokes a GPS (Global Positioning System, global positioning system) function on the player terminal to report the current location information to the virtual server; or invokes a Wi-Fi (Wireless Fidelity, wireless fidelity) function of the player terminal to report the current location information of the player terminal to the virtual server through a base station in a cell. According to the location information reported by the player terminal, the virtual server may search for a nearby player terminal on which the same player is installed, and send an invitation instruction to the player terminal; upon receiving an invitation response sent by the player terminal, the virtual server may add the player terminal to the virtual studio.

On the one hand, the virtual server determines a media file play channel suitable for each player terminal according to play features of at least two player terminals entering the virtual studio. The play features of the terminals may include play timbre attributes of the terminals, such as effects of super bass, high pitch, audio mixing, and so on; and may further include play volume attributes of the terminals such as volume values.

Specifically, after the player terminals are added to the virtual studio, the virtual server may determine the play features of each player terminal. Alternatively, the virtual server may send a detection instruction to the player terminals entering the virtual studio, where the detection instruction is used to instruct each of the player terminals to play a first test media file and record what another player terminal plays when the other player terminal plays the first test media file to obtain a second test media file as a record file That is, each player terminal may play the first test media file, so that another player terminal entering the virtual studio records what the player terminal plays to obtain a record file. It can be understood that a file, which is obtained by each player terminal recording what another player terminal entering the virtual studio plays when the another player terminal plays the first test media file, is a second test media file.

The virtual server may receive the record file sent by each player terminal entering the virtual studio, that is, the second test media file; and the virtual server may analyze the play features of each player terminal according to the record file. The play effect of each player terminal on different channels is analyzed according to the music effect of the record file of each player terminal. For example, if the sound effect achieved by a player terminal in playing a super bass channel is perfect, this player terminal is determined for playing the super bass channel.

On the other hand, the virtual server may determine the play time from which each player terminal begins a synchronous play. Specifically, the virtual server may determine the play start time of each player terminal according to system time of each player terminal, a delay between an audio adapter of each terminal and system time of each terminal, and a delay between the system time of each player terminal and system time of the virtual studio, so as to ensure that all terminals entering the virtual studio can play the same media file synchronously.

Alternatively, on the basis of determining the play channel and the play time of each player terminal, the virtual server may further determine a spatial placement of each player terminal according to the play features. For example, according to the record files of player terminal A and player terminal B recorded by player terminal C, it is determined that the spatial distance between player terminal C and player terminal A is different from the spatial distance between player terminal C and player terminal B; the basis of such determining may be that the volume of player terminal C recording the record file of player terminal A is different from the volume of recording the record file of player terminal B; the volume may be compared to obtain a topological distance figure of each player terminal entering the virtual studio; by taking the play channel of the player terminal into account, the best spatial placement of the player terminal may be determined, so that the user can have good audio experience.

S103. The virtual server sends control information respectively to the player terminals entering the virtual studio.

The control information includes information about the play time and the play channels of the player terminals and is used to control the player terminals to play the media file synchronously on corresponding channels at corresponding play time.

It can be understood that if the virtual server determines the spatial placement of each player terminal according to the play features in S102, the virtual server may add the spatial placement information corresponding to each player terminal into control information, and send it to the player terminal.

In this embodiment, a virtual server that creates a virtual studio sends a detection instruction to each player terminal entering the virtual studio to determine a player channel of each player terminal, so that terminals out of a sound system can enter the virtual studio to play different channels of a media file synchronously under control of the virtual server; further, a spatial placement that optimizes the play effect of each player terminal is given, which facilitates users and improves play experience of the users.

Figure 2:
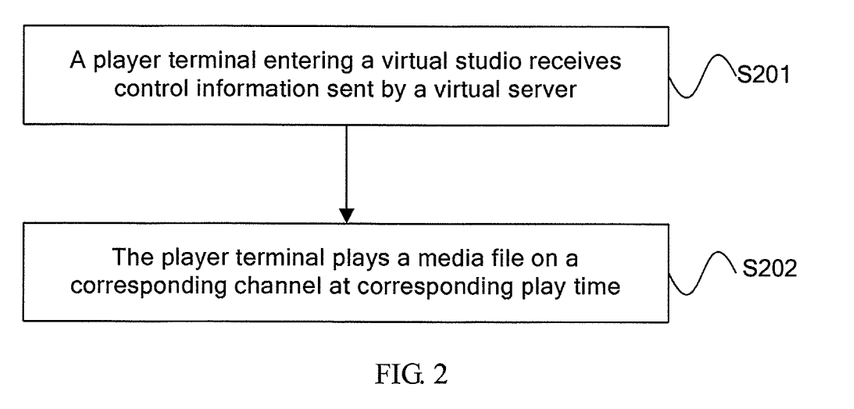
FIG. 2 is a flowchart of a multi-terminal synchronous play control method according to a second embodiment of the present invention.

FIG. 2 is a flowchart of a multi-terminal synchronous play control method according to a second embodiment of the present invention. As shown in FIG. 2, the entity for performing the following steps is a player terminal entering a virtual studio, and may specifically be a mobile phone, a PAD, a PC, or other terminals capable of playing a media file. The method includes the following steps:

S201. The player terminal entering the virtual studio receives control information sent by a virtual server.

The control information includes information about play time and a play channel of the player terminal.

S202. The player terminal plays a media file on the corresponding channel at the corresponding play time.

According to the control information, player terminals entering the virtual studio can play the same media file synchronously by using the play channels determined by the virtual server.

The player terminal involved in the embodiment of the present invention refers to a player terminal entering the virtual studio. In a practicable implementation, on the player terminal, the user may input an identifier (ID) of the virtual studio created by the virtual server to search for the virtual studio, and the player terminal may send an entering request for entering the virtual studio to the virtual studio; upon receiving the entering request sent by the player terminal, the virtual server may add the player terminal sending the request into the virtual studio.

In another practicable implementation, the player terminal receives an invitation instruction sent by the virtual server, and sends an invitation response to the virtual server. Specifically, a resource file of the player software carries a pseudo identifier indicative of the player. When being installed on the player terminal, the player software reports the pseudo identifier to the virtual server. Alternatively, the user may use the player software to associate the pseudo identifier stored in the virtual server with a user name of the player terminal. When the user starts the player software or when the player software runs at the background of the player terminal, the player software invokes a GPS (Global Positioning System, global positioning system) function on the player terminal to report the current location information to the virtual server; or invokes a Wi-Fi (Wireless Fidelity, wireless fidelity) function of the player terminal to report the current location information of the player terminal to the virtual server through a base station in a cell. According to the location information reported by the player terminal, the virtual server may search for a nearby player terminal on which the same player is installed, and send an invitation instruction to the player terminal; upon receiving an invitation response sent by the player terminal, the virtual server may add the player terminal to the virtual studio.

After the player terminal enters the virtual studio, the virtual server determines a media file play channel suitable for each player terminal according to play features of at least two player terminals entering the virtual studio. The play features of the terminals may include play timbre attributes of the terminals, such as effects of super bass, high pitch, audio mixing, and so on; and may further include play volume attributes of the terminals such as volume values.

After the player terminal is added to the virtual studio, the virtual server may determine the play features of each player terminal. Alternatively, the player terminal may receive a detection instruction sent by the virtual server, where the detection instruction is used to instruct each player terminal to play a first test media file and record what another player terminal plays when the other player terminal plays the first test media file to obtain a second test media file as a record file. That is, each player terminal may play the first test media file, so that another player terminal entering the virtual studio performs recording to obtain a record file. It can be understood that a file, which is obtained after each player terminal records the first test media file played by another player terminal entering the virtual studio, is a second test media file.

The player terminal may send the record file, that is, the second test media file, to the virtual server; and the virtual server may analyze the play features of each player terminal according to the record file. The play effect of each player terminal is analyzed according to the record file of each player terminal. For example, if the sound effect achieved by a player terminal in playing a super bass channel is perfect, this player terminal is determined for playing the super bass channel.

Alternatively, on the basis of determining the play channel and the play time of each player terminal, the virtual server may further determine a spatial placement of each player terminal according to the play features. For example, according to the record file of player terminal A and player terminal B recorded by player terminal C, it is determined that the spatial distance between player terminal C and player terminal A is different from the spatial distance between player terminal C and player terminal B; the basis of such determining may be that the volume of player terminal C recording the record file of player terminal A is different from the volume of recording the record file of player terminal B; the volume may be compared to obtain a topological distance figure of each player terminal entering the virtual studio; by taking the play channel of the player terminal into account, the best spatial placement of the player terminal may be determined, so that the user can have good audio experience.

After each player terminal receives the control information and obtains the corresponding play time of each player terminal, each player terminal may further determine a play progress time point $t_3$ according to $t_3=Tn+t_2-Ts+t_1$, where Tn is current system time of the player terminal, $t_2$ is a deviation between the system time of the player terminal and system time of the virtual server, Ts is the play time, and $t_1$ is an audio adapter delay of the player terminal. Through adjustment of the play time, all terminals entering the virtual studio can synchronously play the same media file more accurately.

More specifically, according to the play progress time point $t_3$, the player terminal can obtain correct play time based on the current system time of the player terminal. The play time Ts is specified by the virtual server based on the system of the virtual server and is deviated from the time of the system of the player terminal, and the player terminal has an audio adapter delay $t_1$, and therefore, correct play time point can be obtained according to $t_3=Tn+t_2-Ts+t_1$. For example, if the player terminal knows by calculation that $t_3$ is 2 s (s is the time unit "second"), the player terminal starts playing 2 s after receiving the control information; or, if $t_3$ is −2 s (that is, for the system of the virtual server, the play of the media file arrives at a point corresponding to 2 s), the player terminal starts playing at a position that is 2 s away from the start point of the media file.

The system time deviation between one player terminal and the virtual server is different from the system time deviation between another player terminal and the virtual server, and the audio adapter delay also differs, but the corresponding play progress time point $t_3$ can be determined by each player terminal according to $t_3=Tn+t_2-Ts+t_1$. Therefore, all player terminals have the same play progress at the same time point in the system of the virtual server. In addition, for each player terminal, the time of the system of the virtual server is unified. Therefore, in the play process, each player terminal may adjust the play progress according to $t_3=Tn+t_2-Ts+t_1$ to keep synchronization in playing the media file.

More preferably, in the process of playing the media file, when another player terminal enters the virtual studio to perform synchronous play, the corresponding play progress time point $t_3$ can be obtained according to $t_3=Tn+t_2-Ts+t_1$ to align with the play progress of other player terminals. For example, a player terminal entering the virtual studio in the play process obtains the play progress time point $t_3$ as −156 s by calculation, and therefore, this player terminal starts playing the media file at a position that is 156 s away from the start point of the media file, so as to play the same media file synchronously with all other player terminals in the virtual studio.

It should be noted that after receiving the control information, each player terminal needs to extract a channel play file of a corresponding channel in the media file according to the play channel indicated in the control information. If the media file has been divided into channels, the player terminal may extract the channel play file of the corresponding channel in the media file directly; if the media file has not been divided into channels, the player terminal performs digital processing for the media file to obtain multiple virtual channel play files, and, in the multiple virtual channel play files, extracts the channel play file of the corresponding channel indicated in the control information.

In this embodiment, a virtual server that creates a virtual studio controls play time and a play channel of each player terminal by sending control information to the player terminal entering the virtual studio. In this way, terminals out of a sound system can enter the virtual studio to play a media file synchronously under control of the virtual server, which facilitates users and improves play experience of the users.

Figure 3:
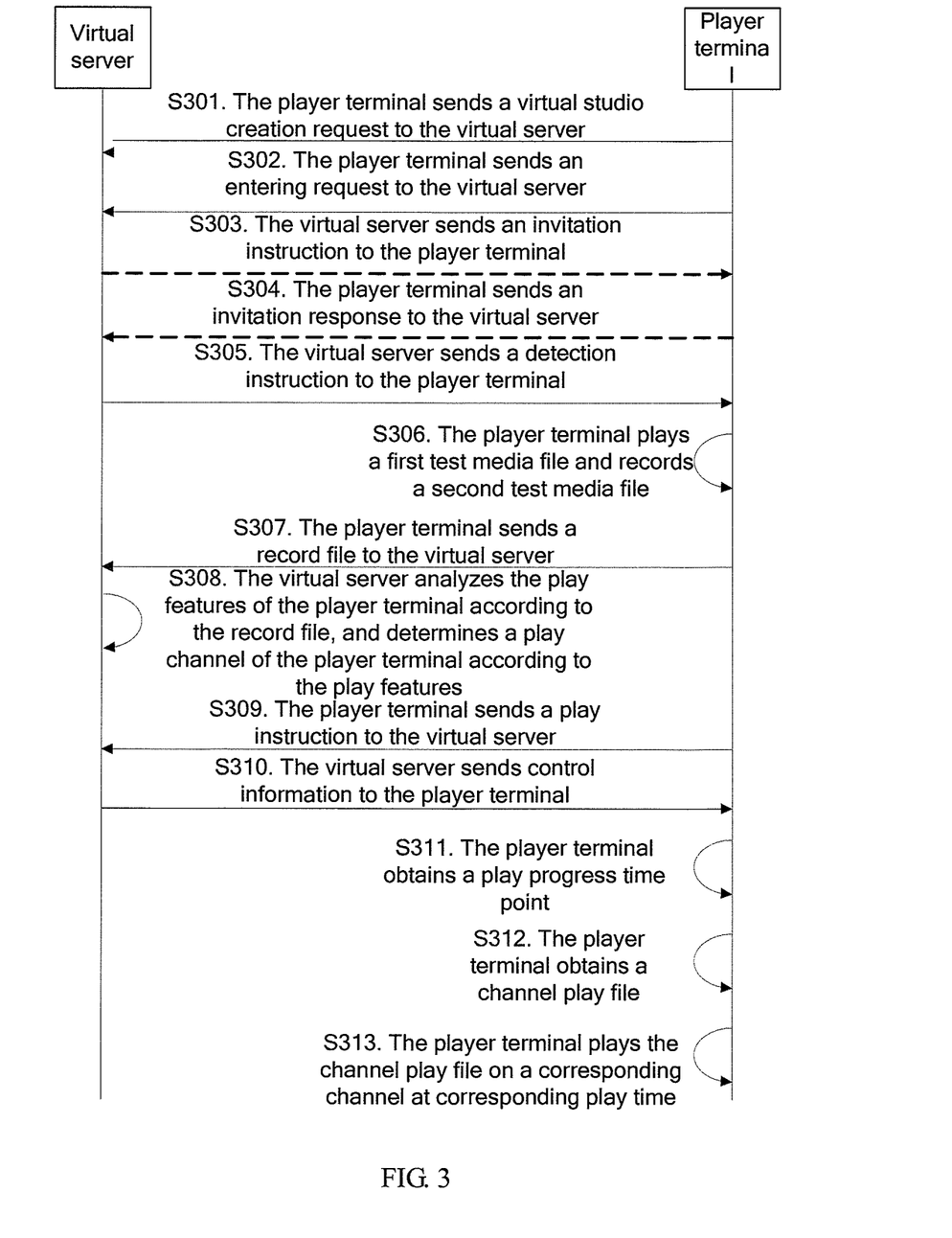
FIG. 3 is a signaling flowchart of a multi-terminal synchronous play control method according to a third embodiment of the present invention.

FIG. 3 is a signaling flowchart of a multi-terminal synchronous play control method according to a third embodiment of the present invention. As shown in FIG. 3, this embodiment provides a whole process of creating a virtual studio and playing the same media file synchronously by all player terminals entering the virtual studio. The method includes the following steps:

S301. The player terminal sends a virtual studio creation request to the virtual server.

A user starts player software installed on the player terminal, and clicks the player software to trigger sending of a virtual studio creation request to the virtual server. For each player terminal located on the Internet, the virtual server may be arranged on a public network server; for each terminal located on a local area network, the virtual sever may be arranged on any player terminal entering the virtual studio. After the virtual studio is created on the virtual server, the virtual server uses the player terminal sending the virtual studio creation request as a management terminal of the virtual studio by default.

S302. The player terminal sends an entering request to the virtual server.

In a practicable implementation, on the player terminal, the user may input an identifier (ID) of the virtual studio created by the virtual server to search for the virtual studio, and the player terminal may send an entering request for entering the virtual studio to the virtual studio; upon receiving the entering request sent by the player terminal, the virtual server may add the player terminal sending the request into the virtual studio.

Alternatively, in another practicable implementation, S303 and S304 may be performed to add the player terminal to the virtual studio, that is, the effect of S302 may be implemented through S303 and S304. As shown in FIG. 3, in this embodiment, after S301 and S302 are performed, the procedure may proceed to S305; or, after S301 is performed, the procedure proceeds to S303.

S303. The virtual server sends an invitation instruction to the player terminal.

The virtual server searches for the player terminal according to location information of the player terminal, and sends an invitation instruction to the player terminal. Specifically, S102 may be referenced.

S304. The player terminal sends an invitation response to the virtual server.

Upon receiving the invitation response sent by the player terminal, the virtual server adds the player terminal to the virtual studio. At this time, the virtual studio not only includes the management terminal set by the virtual server by default, but also includes at least one player terminal. Alternatively, the user may specify any one player terminal in the virtual studio as a management terminal of the virtual studio as required.

S305. The virtual server sends a detection instruction to the player terminal.

The virtual server determines a media file play channel suitable for each player terminal according to play features of at least two player terminals entering the virtual studio. Therefore, alternatively, through the detection instruction, the virtual server lets the at least two player terminals in the virtual studio collaborate with the virtual server to analyze play features of each player terminal.

S306. The player terminal plays a first test media file and records a second test media file.

After receiving the detection instruction, each player terminal plays the first test media file according to the detection instruction so that the first test media file is recorded by other player terminals, and each player terminal records what another player terminal plays when the other player terminal plays the first test media file to obtain a second test media file as a record file. That is, each player terminal may play the first test media file, so that another player terminal in the virtual studio performs recording to obtain a record file. It can be understood that a file, which is obtained after each player terminal records the first test media file played by another player terminal entering the virtual studio, is a second test media file.

The first test media file and the second test media file are system media files of the player software, and are used to analyze play features of the player terminal. The first test media file may be the same as or different from the second test media file.

S307. The player terminal sends a record file to the virtual server.

S308. The virtual server analyzes the play features of the player terminal according to the record file, and determines the play channel of the player terminal according to the play features.

The virtual server may receive the record file sent by each player terminal entering the virtual studio, that is, the second test media file; and the virtual server may analyze the play features of each player terminal according to the record file.

S309. The player terminal sends a play instruction to the virtual server.

For each player terminal on the Internet, the play instruction sent by the user to the virtual server through the player software on the management terminal carries information about a media file to be played. According to the information, the virtual server controls each of other terminals in the virtual studio to download the media file to a local directory for playing synchronously. For each player terminal on a local area network, the player terminal acting as a management terminal shares and sends the media file to be played, to each player terminal in the virtual studio.

S310. The virtual server sends control information to the player terminal.

The virtual server sends control information respectively to the player terminals entering the virtual studio, where the control information includes information about the play time and the play channels of the player terminals and is used to control the player terminals to play the media file synchronously on corresponding channels at corresponding play time; and the control information further includes spatial placements of the player terminals, where the spatial placements are determined according to the play features of the player terminals, and can achieve a better play effect of each player terminal.

S311. The player terminal obtains a play progress time point.

Specifically, the virtual server sends play time Ts to the player terminal according to the system time of the virtual server, and the player terminal plays determines the play progress time point $t_3$ by using $t_3=Tn+t_2-Ts+t_1$ according to the play time Ts, the current system time Tn of the player terminal, a deviation $t_2$ between the system time of the player terminal and the system time of the virtual server, and an audio adapter delay $t_1$ of the player terminal. It should be noted that for each player terminal on a local area network, the system time of the virtual server is the time of the system of the management terminal, and that $t_2$ is a time deviation between the system of the player terminal and the system of the management terminal, where $t_3$ is a time difference, that is, a time interval from the player terminal receiving the control information to starting the player to play the media file. For example, if the player terminal knows by calculation that $t_3$ is 2 s, the player terminal starts playing the media file 2 s after receiving the control information; or, if $t_3$ is −2 s, the player terminal starts playing the media file at the current time directly at a position that is 2 s away from the start point of the media file. Through adjustment of the play time, all terminals entering the virtual studio can synchronously play the same media file more accurately.

More preferably, each player terminal may calibrate the play progress according to $t_3=Tn+t_2-Ts+t_1$ in the play process so that all player terminals can implement synchronous play in a concordant manner. In the synchronous play process, a player terminal newly entering the virtual studio may obtain the corresponding play progress time point $t_3$ according to $t_3=Tn+t_2-Ts+t_1$ to adjust the play progress. For example, a player terminal entering the virtual studio in the play process obtains the play progress time point $t_3$ as −156 s by calculation, and therefore, the player terminal starts playing the media file at a position that is 156 s away from the start position of the media file, so as to play the same media file synchronously with all player terminals in the virtual studio.

S312. The player terminal obtains a channel play file.

The player terminal extracts the channel play file of the corresponding channel from the media file according to the play channel indicated in the control information. Specifically, if the media file has been divided into channels, the player terminal may extract the channel play file of the corresponding channel in the media file directly; if the media file has not been divided into channels, the player terminal performs digital processing for the media file to obtain multiple virtual channel play files, and, in the multiple virtual channel play files, extracts the channel play file of the corresponding channel indicated in the control information.

S313. The player terminal plays the channel play file on the corresponding channel at the corresponding play time.

Through S311 and S312, the play progress time point and the channel play file are obtained, and the corresponding play time of the player terminal is determined according to the play progress time point. As described in S311, the player terminal knows by calculation that $t_3$ is 2 s, and therefore, the corresponding play time of the player terminal is 2 s after the player terminal receives the control information, and, at this play time, the player terminal plays the channel play file obtained in S312.

In this embodiment, a virtual server that creates a virtual studio controls play time and a play channel of each player terminal by sending control information to the player terminal entering the virtual studio. In this way, terminals outside a sound system can enter the virtual studio to play a media file synchronously under control of the virtual server, which facilitates users and improves play experience of the users.

Persons of ordinary skill in the art may understand that all or a part of the steps of the method embodiments may be implemented by a program instructing relevant hardware. The program may be stored in a computer readable storage medium. When the program is run, the steps of the foregoing methods in the embodiments are performed. The storage medium includes any medium that is capable of storing program codes, such as a ROM, a RAM, a magnetic disk, or an optical disk.

Figure 4:
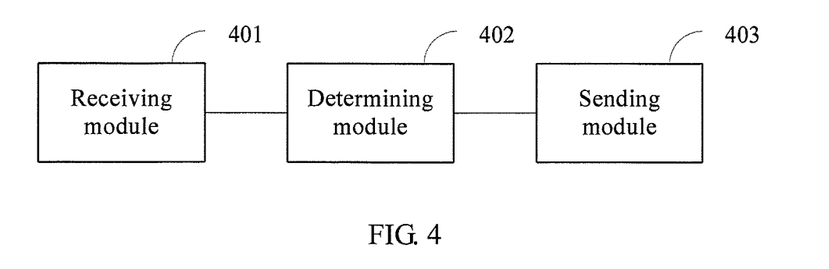
FIG. 4 is a schematic structural diagram of a virtual server according to a first embodiment of the present invention.

FIG. 4 is a schematic structural diagram of a virtual server according to a first embodiment of the present invention. As shown in FIG. 4, a virtual server includes:

a receiving module 401, configured to receive a play instruction issued by a user, where the play instruction is an instruction for playing a media file;

a determining module 402, configured to determine playtime and play channels of at least two player terminals entering the virtual studio; and a sending module 403, configured to send control information respectively to the player terminals entering the virtual studio, where the control information includes information about the play time and the play channels of the player terminals and is used to control the player terminals to play the media file synchronously on corresponding channels at corresponding play time.

Each module in this embodiment corresponds to the method embodiment described above, and is not further detailed herein.

In this embodiment, a virtual server that creates a virtual studio controls playtime and a play channel of each player terminal by sending control information to the player terminal entering the virtual studio. In this way, terminals outside a sound system can enter the virtual studio to play a media file synchronously under control of the virtual server, which facilitates users and improves play experience of the users.

The receiving module 401 in the virtual server is further configured to receive an entering request sent by the player terminal, so that the virtual server adds the player terminal into the virtual studio; or the sending module 403 is further configured to search for the player terminals according to location information of the player terminals, and send an invitation instruction to the player terminals, and therefore, the receiving module 401 is configured to receive an invitation response sent by the player terminals, and the virtual server adds the player terminals to the virtual studio.

The sending module 403 is further configured to send a detection instruction to the player terminals entering the virtual studio, where the detection instruction is used to instruct each of the player terminals to play a first test media file and record what another player terminal plays when the other player terminal plays the first test media file to obtain a second test media file as a record file; and the receiving module 401 is configured to receive the record files sent by the player terminals.

The determining module 402 is configured to analyze the play features of the player terminals according to the record files, and determine the play channels of the player terminals according to the play features.

The control information further includes spatial placement information of the player terminals, and therefore, the determining module 402 of the virtual server is configured to determine spatial placements of the player terminals according to the play features.

The determining module 402 is configured to determine the play time of the player terminals according to audio adapter delay information of the player terminals and information about a deviation between system time of the player terminals and system time of the virtual server.

The virtual server is arranged on a public network server or on any one of the player terminals entering the virtual studio.

Each module in this embodiment corresponds to the method embodiment described above, and is not further detailed herein.

In this embodiment, a virtual server that creates a virtual studio controls play time and a play channel of each player terminal by sending control information to the player terminal entering the virtual studio. In this way, terminals outside a sound system can enter the virtual studio to play a media file synchronously under control of the virtual server, which facilitates users and improves play experience of the users.

Figure 5:
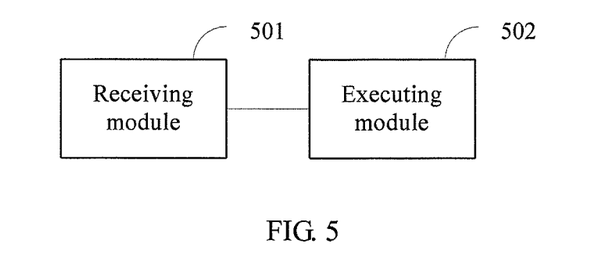
FIG. 5 is a schematic structural diagram of a player terminal according to a first embodiment of the present invention.

FIG. 5 is a schematic structural diagram of a player terminal according to a first embodiment of the present invention. As shown in FIG. 5, the player terminal includes:

a receiving module 501, configured to receive control information sent by a virtual server, where the control information includes information about play time and a play channel of the player terminal; and an executing module 502, configured to play a media file on the corresponding channel at the corresponding play time.

Each module in this embodiment corresponds to the method embodiment described above, and is not further detailed herein.

In this embodiment, a virtual server that creates a virtual studio controls play time and a play channel of each player terminal by sending control information to the player terminal entering the virtual studio. In this way, terminals outside a sound system can enter the virtual studio to play a media file synchronously under control of the virtual server, which facilitates users and improves play experience of the users.

Figure 6:
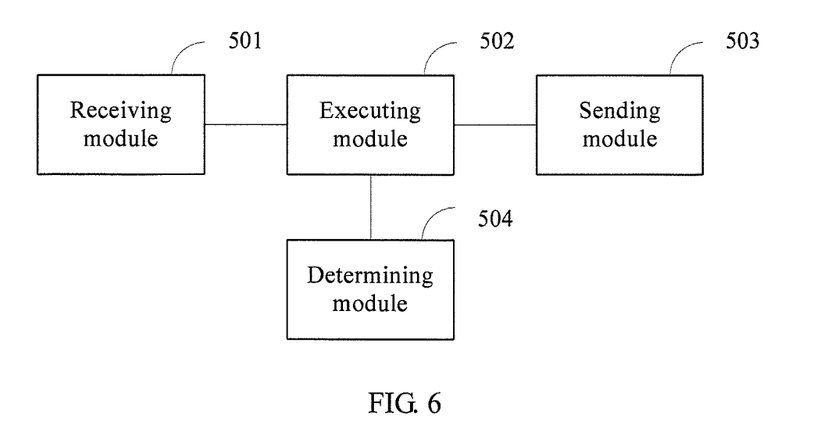
FIG. 6 is a schematic structural diagram of a player terminal according to a second embodiment of the present invention.

FIG. 6 is a schematic structural diagram of a player terminal according to a second embodiment of the present invention. On the basis of the embodiment shown in FIG. 5, as shown in FIG. 6, the player terminal further includes a sending module 503, configured to search for the virtual studio according to location information of the virtual studio, and send an entering request to the virtual studio; or, the receiving module 501 is further configured to receive an invitation instruction sent by the virtual server, so that the sending module 503 sends an invitation response to the virtual server.

The receiving module 501 is configured to receive a detection instruction sent by the virtual server, where the detection instruction is used to instruct each of the player terminals to play a first test media file and record what another player terminal plays when the other player terminal plays the first test media file to obtain a second test media file as a record file; and therefore, the executing module 502 is configured to play the first test media file and record the second test media file to obtain the record file; and the sending module 503 is configured to send the record file to the virtual server.

The control information further includes a spatial placement of the player terminal. Therefore, the player terminal further includes a determining module 504, configured to determine a play progress time point $t_3$ according to $t_3=Tn+t_2-Ts+t_1$, where Tn is current system time of the player terminal, $t_2$ is a deviation between the system time of the player terminal and system time of the virtual server, Ts is the play time, and $t_1$ is an audio adapter delay of the player terminal.

The executing module 502 is configured to extract a channel play file of the corresponding channel from the media file; and play the channel play file on the corresponding channel at the corresponding play time.

In this embodiment, a virtual server that creates a virtual studio controls play time and a play channel of each player terminal by sending control information to the player terminal entering the virtual studio. In this way, terminals outside a sound system can enter the virtual studio to play a media file synchronously under control of the virtual server, which facilitates users and improves play experience of the users.

Finally, it should be noted that the foregoing embodiments are merely intended for describing the technical solutions of the present invention, other than limiting the present invention. Although the present invention is described in detail with reference to the foregoing embodiments, a person of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A multi-terminal synchronous play control method, comprising:

receiving, by a virtual server, a play instruction issued by a user, wherein the play instruction is an instruction for playing a media file;

determining, by the virtual server, play time and play sound channels of at least two player terminals entering a virtual studio; and sending, by the virtual server, control information respectively to the player terminals entering the virtual studio, wherein the control information comprises information about the play time and the play sound channels of the player terminals and is used to control the player terminals to play the media file synchronously on corresponding sound channels at corresponding play time;

wherein before the virtual server determines the play sound channels of the at least two player terminals entering the virtual studio, the method further comprises:

sending, by the virtual server, a detection instruction to the player terminals entering the virtual studio, wherein the detection instruction is used to instruct each of the player terminals to play a first test media file and record what another player terminal plays when the other player terminal plays the first test media file to obtain a second test media file as a record file; and receiving, by the virtual server, the record files sent by the player terminals;

wherein determining, by the virtual server, the play sound channels of the at least two player terminals entering the virtual studio comprises:

analyzing, by the virtual server, play features of the player terminals according to the record files, and determining the play sound channels of the player terminals according to the play features.

2. The method according to claim 1, wherein before the virtual server receives the play instruction issued by the user, the method further comprises:

receiving, by the virtual server, an entering request sent by the player terminals, and adding the player terminals to the virtual studio; or searching, by the virtual server, for the player terminals according to location information of the player terminals, sending an invitation instruction to the player terminals, receiving an invitation response sent by the player terminals, and adding the player terminals to the virtual studio.

3. The method according to claim 1, wherein the control information further comprises spatial placement information of the player terminals, and the method further comprises:

determining, by the virtual server, spatial placements of the player terminals according to the spatial placement information of the player terminals.

4. The method according to claim 1, wherein determining, by the virtual server, the play time of the at least two player terminals entering the virtual studio comprises:

determining, by the virtual server, the play time of the player terminals according to audio adapter delay information of the player terminals and information about a deviation between system time of the player terminals and system time of the virtual server.

5. A multi-terminal synchronous play control method, comprising:

receiving, by a player terminal entering a virtual studio, a detection instruction sent by a virtual server, wherein the detection instruction is used to instruct the player terminal to play a first test media file and record what another player terminal plays when the other player terminal plays the first test media file to obtain a second test media file as a record file;

playing, by the player terminal, the first test media file, and recording the second test media file to obtain the record file;

sending, by the player terminal, the record file to the virtual server;

receiving, by the player terminal, control information sent by the virtual server, wherein the control information comprises information about the play time and the play sound channel of the player terminal, wherein the control information is determined by the virtual server in accordance with a play feature of the player terminal according to the record file; and playing, by the player terminal, a media file on the corresponding sound channel at the corresponding play time.

6. The method according to claim 5, wherein before the player terminal entering the virtual studio receives the control information sent by the virtual server, the method further comprises:

searching, by the player terminal, for the virtual studio according to location information of the virtual studio, and sending an entering request to the virtual studio; or, receiving, by the player terminal, an invitation instruction sent by the virtual server, and sending an invitation response to the virtual server.

7. The method according to claim 5, wherein the control information further comprises a spatial placement of the player terminal.

8. The method according to claim 5, wherein playing, by the player terminal, the media file at the corresponding play time comprises:

determining, by the player terminal, a play progress time point $t_3$ according to $t_3 = Tn + t_2 - Ts + 4$, wherein Tn is current system time of the player terminal, $t_2$ is a deviation between the system time of the player terminal and system time of the virtual server, Ts is the play time, and $t_1$ is an audio adapter delay of the player terminal.

9. The method according to claim 5, wherein playing, by the player terminal, the media file on the corresponding sound channel at the corresponding play time comprises:

extracting, by the player terminal, a sound channel play file of the corresponding sound channel from the media file; and playing, by the player terminal, the sound channel play file on the corresponding sound channel at the corresponding play time.

10. A virtual server, comprising:

a memory storing computer executable program codes; and a processor, coupled with the memory;

wherein the program codes comprise instructions which, when executed by the processor, cause the processor to:

receive a play instruction issued by a user, wherein the play instruction is an instruction for playing a media file;

determine play time and play sound channels of at least two player terminals entering a virtual studio; and send control information respectively to the player terminals entering the virtual studio, wherein the control information comprises information about the play time and the play sound channels of the player terminals and is used to control the player terminals to play the media file synchronously on corresponding sound channels at corresponding play time;

wherein the program codes further comprise instructions which, when executed by the processor, cause the processor to:

send a detection instruction to the player terminals entering the virtual studio, wherein the detection instruction is used to instruct each of the player terminals to play a first test media file and record what another player terminal plays when the other player terminal plays the first test media file to obtain a second test media file as a record file;

receive the record files sent by the player terminals; and analyze play features of the player terminals according to the record files and determine the play sound channels of the player terminals according to the play features.

11. The virtual server according to claim 10, wherein the program codes further comprise instructions which, when executed by the processor, cause the processor to:

receive an entering request sent by the player terminals, so that the virtual server adds the player terminals to the virtual studio; or search for the player terminals according to location information of the player terminals, and send an invitation instruction to the player terminals, receive an invitation response sent by the player terminals, and add the player terminals to the virtual studio.

12. The virtual server according to claim 10, wherein the control information further comprises spatial placement information of the player terminals, and the program codes further comprise instructions which, when executed by the processor, cause the processor to:

determine spatial placements of the player terminals according to the play features.

13. The virtual server according to claim 10, wherein the program codes comprise instructions which, when executed by the processor, cause the processor to:

determine the play time of the player terminals according to audio adapter delay information of the player terminals and information about a deviation between system time of the player terminals and system time of the virtual server.

14. The virtual server according to claim 10, wherein the virtual server is arranged on a public network server or on any one of the player terminals entering the virtual studio.

15. A player terminal, comprising:

a memory storing computer executable program codes; and a processor, coupled with the memory;

wherein the program codes comprise instructions which, when executed by the processor, cause the processor to:

receive control information sent by a virtual server, wherein the control information comprises information about play time and a play sound channel of the player terminal;

play a media file on the corresponding sound channel at the corresponding play time; and determine a play progress time point $t_3$ according to $t_3 = Tn + t_2 - Ts + t_1$, wherein Tn is current system time of the player terminal, $t_2$ is a deviation between the system time of the player terminal and system time of the virtual server, Ts is the play time, and $t_1$ is an audio adapter delay of the player terminal.

16. The player terminal according to claim 15, wherein the program codes further comprise instructions which, when executed by the processor, cause the processor to:

search for the virtual studio according to location information of the virtual studio, and send an entering request to the virtual studio; or the receiving module is further configured to receive an invitation instruction sent by the virtual server, so that the sending module sends an invitation response to the virtual server.

17. The player terminal according to claim 15, wherein the program codes comprise instructions which, when executed by the processor, cause the processor to:

receive a detection instruction sent by the virtual server, wherein the detection instruction is used to instruct each player terminal to play a first test media file and record what another player terminal plays when the other player terminal plays the first test media file to obtain a second test media file as a record file; and play the first test media file and record the second test media file to obtain the record file; and send the record file to the virtual server.

18. The player terminal according to claim 15, wherein the control information further comprises a spatial placement of the player terminal.

19. The player terminal according to claim 15, wherein the program codes comprise instructions which, when executed by the processor, cause the processor to:

extract a sound channel play file of the corresponding sound channel from the media file; and play the sound channel play file on the corresponding sound channel at the corresponding play time.

* * * * *